Patented July 9, 1946

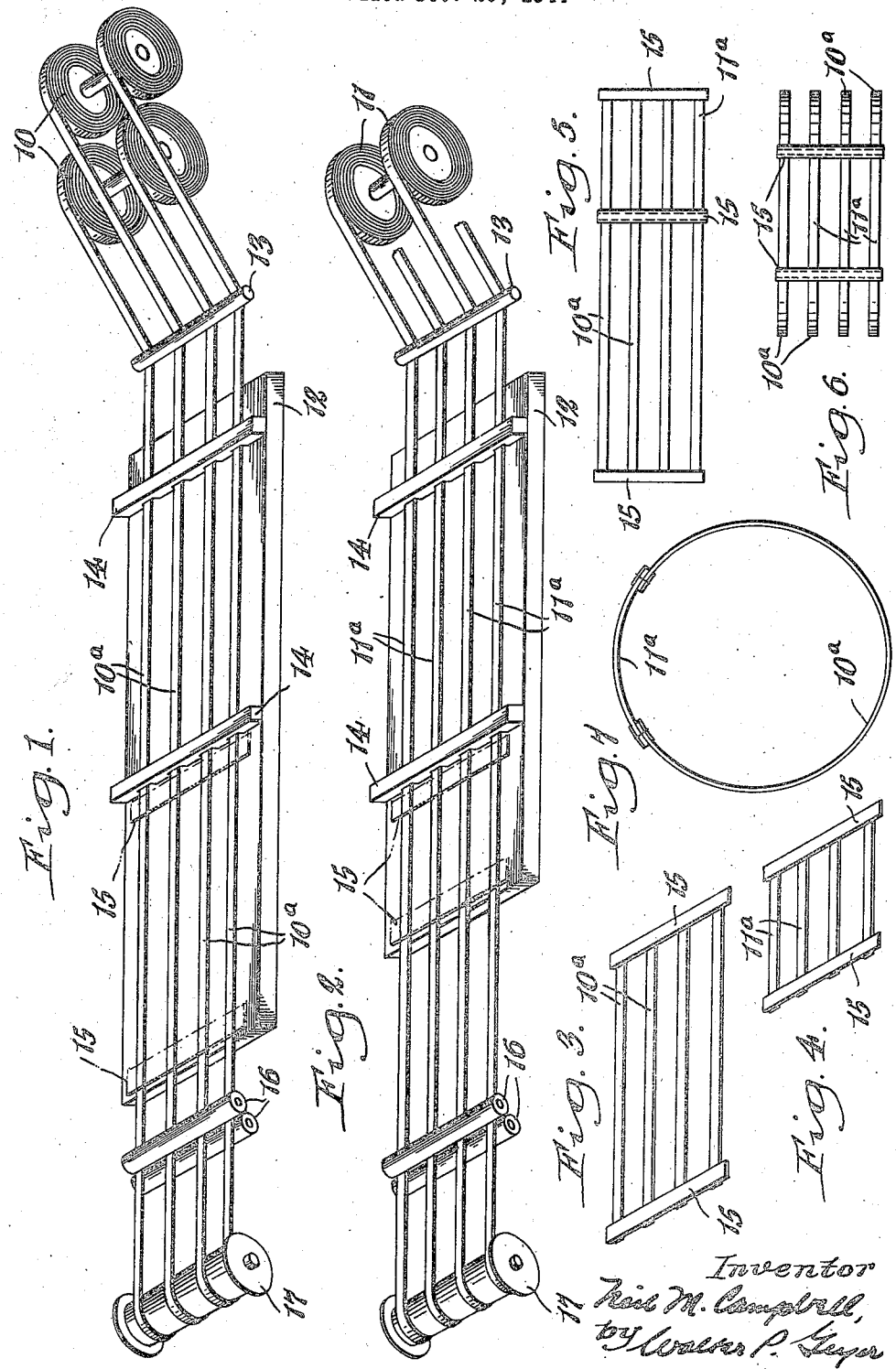

2,403,786

UNITED STATES PATENT OFFICE 2,403,786

METHOD OF MAKING COMPOSITE BANDS

Neil M. Campbell, Buffalo, N. Y., assignor to American Allsafe Company, Inc., Buffalo, N. Y., a corporation of New York Application December 20, 1944, Serial No. 569,077

6 Claims. (Cl. 2—243)

This invention relates to certain new and useful improvements in the art of making semi-elastic or like composite bands, that is, bands made in part of fabric or non-elastic tape or the like and in part of elastic tape, such bands being used, for example, as head bands for sweat pads, goggles, etc.

It has for its main object to provide a method of making composite bands of this character which is simple, expeditious and economical in operation, and whereby a plurality of such bands may be made in a minimum period of time.

Another object of the invention is to provide a novel method of accurately alining and temporarily securing the fabric and elastic tapes into independent unit assemblies and then permanently joining such unit tapes into circular form and finally cutting the same into individual composite bands.

Other features of the invention reside in the novel steps of the method hereinafter set forth and particularly pointed out in the appended claims.

In the accompanying drawing:

Figures 1 and 2 are diagrammatic perspective views showing a form of apparatus used for carrying out my method of making composite bands, showing the manner of assembling in groups or units, respectively, the separate elastic and non-elastic tapes which constitute the composite band. Figures 3 and 4 are perspective views of one of the non-elastic and elastic tape units. Figure 5 is a plan view showing a pair of the companion tape units partially assembled in alined relation. Figure 6 is a side elevation thereof in completely assembled circular fashion in readiness to be cut into individual finished bands. Figure 7 is a perspective view of one of the finished bands.

Similar characters of reference indicate corresponding parts throughout the several views.

In carrying out my novel method of making a fabric-elastic or like composite tape for use as head bands and the like, I employ a plurality of reels or spools of fabric tape and a like number of reels or spools of elastic tape; guiding the respective groups of tapes in parallel side by side flatwise fashion over a working table or platform; applying adhesive or like attaching strips transversely of the tapes of each group at predetermined spaced points lengthwise thereof to maintain the several tapes in measured parallel relation; cutting each measured group of tapes transversely and centrally of each attaching strip to separate the same into individual units of predetermined length and each unit composed of a plurality of tapes tied or joined together by the attaching strips at their opposite ends; temporarily joining each elastic tape unit in endwise or tape alined and in circular relation with the opposing ends of a companion fabric tape unit through the medium of the opposing transverse attaching strips which are imposed one over the other; and finally permanently securing the alined fabric and elastic units into a composite assembly by stitching or the like along the superimposed attaching strips and then severing the alined tape-sections of both units along the intersecting or bridging points of the attaching strips to produce individual composite bands composed of alined lengths of fabric and elastic tapes.

Referring now to the drawing showing more or less diagrammatically one form of apparatus which may be employed for carrying out my invention, 10 indicates a plurality of reels or spools of fabric tape, shown in Figure 1, and 11 indicates a plurality of reels or spools of elastic tape, shown in Figure 2, each group of reels being disposed in overhead relation to a companion working table or platform 12 and the corresponding tapes 10ª and 11ª thereof being guided thereto by guide rollers 13 or the like. Applied crosswise of the top side of each table in suitably spaced relation lengthwise thereof are grooved guide bars 14 which guide the tapes in spaced, parallel, flatwise relation over the table. While passing over the table, transverse strips 15 of adhesive tape or the like, such as "Scotch" tape, are applied at spaced points lengthwise of the tapes of each group to maintain the several tapes in their guide-determined parallel relation after leaving the table. The strips are applied at predetermined equal distances apart. In the case of the fabric tapes 10ª, for instance, they are applied at, say, eighteen inches apart, while in the case of the elastic tapes 11ª, the retaining strips are applied at, say, four inches apart. From its companion table, each group of strip-joined tapes is passed between feed rollers 16 and thence directed to a take-up reel 17, or if desired, a suitable receiver. In practice, the respective groups of tapes are fed intermittently over their companion tables and when at rest, one retaining strip 15 is applied, for example, along one side of the left-hand guide 14, viewing Figure 1 or Figure 2, in parallel relation thereto, while another retaining strip is applied to the tapes at the left hand end of the table, the end of the latter serving as a gage for this purpose. If desired, however, during each intermittent movement of the tapes, a retaining strip may be applied at a point alongside the aforesaid guide 14 with the end of the table serving as the length gage.

Having gaged or measured the two groups of tapes 10ᵃ and 11ᵃ to the respective lengths desired and at the same time having retained the tapes of each group in parallel relation by the transverse strips 15 while being wound upon their companion take-up reels 16, the groups are then separated into units by unwinding the same from their take-up reels, presenting them to a suitable knife or cutter, and cutting the same transversely and centrally of each measure-indicating attaching strip 15, each resulting unit being composed of a plurality of tapes temporarily joined at their ends by the severed sections of the cross strips, as shown in Figures 3 and 4. The fabric tape units are then assembled in adjoining endwise relation with companion elastic tape units, as shown in Figure 5, after which the opposite free ends of those two units are brought together and joined in circular fashion, as seen in Figure 6. In each joining operation, the adhesive strips 15 are brought into superposed relation and serve to temporarily hold the several fabric and elastic tapes in alinement. Thereafter, each temporarily joined composite tape unit is permanently joined at the same points by zig-zag lock stitching or the like. The operation is completed by cutting the alined tape sections of both units across the bridging portions of the strips 15 to provide the individual composite bands, one of which is depicted in Figure 7.

While manifestly simple, this method of making composite bands of the character described, is very expeditious and economical and it enables large numbers of the bands to be made in minimum period of time and with a minimum of man power and without the use of expensive equipment.

I claim as my invention:

1. The method of making composite bands from tape lengths of different materials, which consists in guiding a group of tapes of each material in parallel relation, applying attaching strips transversely of the groups of tapes at predetermined spaced points lengthwise thereof to maintain the tapes in parallel alinement, and cutting the tapes transversely and substantially centrally of each attaching strip to separate the same into group-units.

2. The method of making semi-elastic bands, which consists in guiding a plurality of elastic tapes flatwise in parallel relation, joining said tapes transversely at predetermined spaced points lengthwise thereof to provide a unitary assembly composed of measured groups of elastic tape-sections, guiding a plurality of non-elastic tapes flatwise in parallel relation, joining said last-named tapes transversely at predetermined spaced points lengthwise thereof to provide a second unitary assembly composed of measured groups of non-elastic tape-sections, and cutting each unitary assembly transversely and substantially in the respective medial planes of the joined spaced points thereof into separate individual groups, each group being composed of a plurality of tapes of predetermined length joined transversely at their ends to maintain them in parallel relation.

3. The method of making composite bands from tape lengths of different materials, which consists in guiding a group of reels of tape of each material in spaced parallel, flatwise relation over a table and then directing the several tapes of each material, respectively, onto a common and companion take-up reel, joining the tapes of each group transversely at predetermined spaced points by adhesive strips to maintain them in parallel and to provide a companion unitary assembly composed of measured tape-sections, cutting each unitary assembly transversely and centrally of the transverse strips to separate the same into individual units with each unit joined at its ends by the respective severed portions of the transverse strips, bringing the individual group-units of one material into registering endwise alinement with companion individual group-units of the other material and fastening such units together at their opposing, strip-connected ends in annular fashion, and then severing those fastened group-units across the tape-bridging portions of said strips to provide individual composite bands composed of tape lengths of the different materials.

4. The method of making composite bands from tape lengths of different materials, which consists in assembling a plurality of tapes of one material and of equal lengths in adjoining parallel relation and connecting them as a unit at their opposite ends, assembling a plurality of tapes of another material in like manner, and then joining the ends of assembled tapes of one unit in longitudinal alinement with the opposing ends of the assembled tapes of the companion unit, and severing the alined tape-sections into individual composite bands.

5. The method of making composite bands from tape lengths of different materials, which consists in assembling a plurality of tapes of one material and of equal lengths in adjoining parallel relation, joining the free ends of said tapes by transverse strips to maintain them in parallel alinement as an assembled unit, assembling a like plurality of tapes of another material in like manner into another unit, joining the strip-connected ends of the tapes of one unit in coextensive alinement with the opposing strip-connected ends of the tapes of the other unit, and then severing the coextensive tape-sections lengthwise along said transverse alining strips to provide individual composite bands.

6. The method of making composite bands from tape lengths of different materials, which consists in assembling a plurality of tapes of one material and of equal lengths in adjoining parallel relation, joining the free ends of said tapes by transverse adhesive strips to maintain them in parallel alinement as an assembled unit, assembling a like plurality of tapes of another material in like manner into another unit, joining the ends of the tapes of one unit in temporary coextensive alinement with the opposing ends of the tapes of the other unit through the medium of the companion adhesive strips, permanently joining such ends of the tape-units in the plane of said strips, and then severing the coextensive tape-sections lengthwise along the transverse alining strips to provide individual composite bands.

NEIL M. CAMPBELL.